US011238567B2

(12) United States Patent
Kuang et al.

(10) Patent No.: US 11,238,567 B2
(45) Date of Patent: Feb. 1, 2022

(54) DATA PROCESSING METHOD AND DEVICE FOR MANAGING DISCREET DISPLAY

(71) Applicant: Lenovo (Beijing) Co., Ltd., Beijing (CN)

(72) Inventors: Yuhao Kuang, Beijing (CN); Liqiang Liu, Beijing (CN); Bang Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 90 days.

(21) Appl. No.: 16/728,871

(22) Filed: Dec. 27, 2019

(65) Prior Publication Data
US 2020/0211164 A1 Jul. 2, 2020

(30) Foreign Application Priority Data

Dec. 29, 2018 (CN) .......................... 201811647018.5

(51) Int. Cl.
*G06T 7/00* (2017.01)
*G06T 5/00* (2006.01)
(Continued)

(52) U.S. Cl.
CPC ................ *G06T 5/003* (2013.01); *G06T 3/40* (2013.01); *G06T 5/50* (2013.01); *G06T 2207/30201* (2013.01)

(58) Field of Classification Search
CPC ...... H04N 7/15; H04N 21/4788; H04N 7/141; H04N 21/4542; G06K 9/00711
See application file for complete search history.

(56) References Cited

U.S. PATENT DOCUMENTS 7,023,464 B1* 4/2006 Harada ................. H04N 7/142
348/14.01
2008/0298571 A1* 12/2008 Kurtz ..................... H04N 7/142
379/156
(Continued)

FOREIGN PATENT DOCUMENTS

CN 1344468 A 4/2002
CN 101951493 A 1/2011
(Continued)

OTHER PUBLICATIONS

Zhang, Cha, Yong Rui, and Li-wei He. "Light weight background blurring for video conferencing applications." 2006 International Conference on Image Processing. IEEE, 2006.*

*Primary Examiner* — Li Liu
(74) *Attorney, Agent, or Firm* — Anova Law Group, PLLC

(57) ABSTRACT

The present disclosure provides a data processing method. The data processing method includes acquiring a first original image and performing a first processing on the first original image to obtain a first processed image, a resolution parameter of the first processed image and the resolution parameter of the first original image having a first difference; and acquiring a second original image and performing a second processing on the second original image to obtain a second processed image. The resolution parameter of the second processed image and the resolution parameter of the second original image have a second difference. The second difference is different from the first difference. The first original image and the second original image are two frames in a plurality of consecutively acquired original images.

16 Claims, 2 Drawing Sheets

Acquiring a first original image, performing a first processing on the first original image to obtain a first processed image, where a resolution parameter of the first processed image and the resolution parameter of the first original image have a first difference. — 101

Acquiring a second original image and performing a second processing on the second original image to obtain a second processed image, where the resolution parameter of the second processed image and the resolution parameter of the second original image have a second difference. The second difference is different from the first difference. The first original image and the second original image are two frames in a plurality of consecutively acquired original images. — 102

(51) Int. Cl.
G06T 3/40 (2006.01)
G06T 5/50 (2006.01)

(56) References Cited

U.S. PATENT DOCUMENTS

| | | | |
|---|---|---|---|
| 2011/0299605 A1* | 12/2011 | Price | H04N 19/40 |
| | | | 375/240.26 |
| 2013/0231101 A1 | 9/2013 | Shaw et al. | |
| 2014/0362163 A1* | 12/2014 | Winterstein | G06T 5/002 |
| | | | 348/14.07 |
| 2015/0195491 A1* | 7/2015 | Shaburov | H04N 7/15 |
| | | | 348/14.12 |
| 2018/0084108 A1 | 3/2018 | Rogers et al. | |

FOREIGN PATENT DOCUMENTS

| | | |
|---|---|---|
| CN | 102648626 A | 8/2012 |
| CN | 103546716 A | 1/2014 |
| CN | 104378553 A | 2/2015 |
| CN | 104933694 A | 9/2015 |
| CN | 105100671 A | 11/2015 |
| CN | 105450971 A | 3/2016 |
| CN | 107438161 A | 12/2017 |
| WO | 2011010788 A1 | 1/2011 |

* cited by examiner

DATA PROCESSING METHOD AND DEVICE FOR MANAGING DISCREET DISPLAY

CROSS-REFERENCE TO RELATED APPLICATION

This application claims the priority to Chinese Patent Application No. 201811647018.5, filed on Dec. 29, 2018, the entire content of which is incorporated herein by reference.

FIELD OF THE DISCLOSURE

The present disclosure generally relates to the field of data processing and, more particularly, relates to a data processing method and device.

BACKGROUND

When a user accidentally turns on an image acquisition device of the user's device and makes a video connection with other party's device, and the user is in a situation inappropriate for the other party to see, the user's privacy is often violated, which can be embarrassing for both parties.

BRIEF SUMMARY OF THE DISCLOSURE

One aspect of the present disclosure provides a data processing method. The data processing method includes acquiring a first original image and performing a first processing on the first original image to obtain a first processed image, a resolution parameter of the first processed image and the resolution parameter of the first original image having a first difference; and acquiring a second original image and performing a second processing on the second original image to obtain a second processed image. The resolution parameter of the second processed image and the resolution parameter of the second original image have a second difference. The second difference is different from the first difference. The first original image and the second original image are two frames in a plurality of consecutively acquired original images.

Another aspect of the present disclosure provides a data processing device. The date processing device includes an acquisition circuit configured to acquire a first original image and a second original image; and a processing circuit configured to perform a first processing on the first original image to obtain a first processed image, a resolution parameter of the first processed image and the resolution parameter of the first original image having a first difference, and to perform a second processing on the second original image to obtain a second processed image, wherein the resolution parameter of the second processed image and the resolution parameter of the second original image have a second difference. Further, the second difference is different from the first difference; and the first original image and the second original image are two frames in a plurality of consecutively acquired original images.

DETAILED DESCRIPTION

To make the foregoing objectives, features and advantages of the present disclosure clearer and more understandable, the present disclosure will be further described with reference to the accompanying drawings and embodiments. The attached drawings are for reference only and are not intended to limit the present disclosure.

Figure 1:
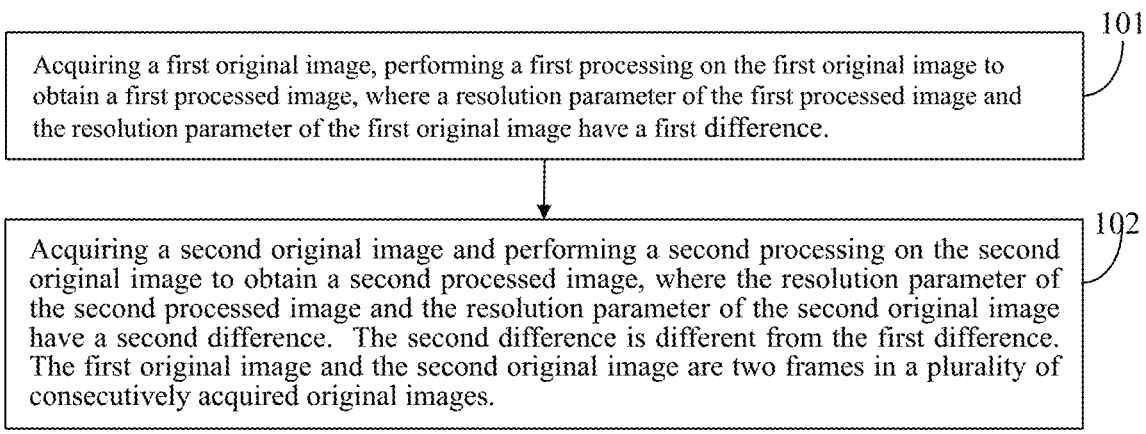
FIG. 1 illustrates a flowchart of an example of a data processing method according to some embodiments of the present disclosure.

FIG. 1 illustrates a flowchart of an example of a data processing method according to some embodiments of the present disclosure. As shown in FIG. 1, the method includes the following.

At 101, a first original image is acquired and a first processing is performed on the first original image to obtain a first processed image. An resolution parameter of the first processed image and an resolution parameter of the first original image have a first difference.

In some embodiments, the method is mainly applied to a first device having a video interaction function. For example, the first device may be a personal computer, such as a notebook computer, a desktop computer, a tablet computer, a smart phone, or a smart watch, etc.

When the first device receives a start instruction for an image acquisition device, the start instruction starts the image acquisition device of the first device. After the image acquisition device is started, the image acquisition device acquires an image of a current environment.

In some embodiments, the resolution parameter may include a sharpness parameter and an image area parameter. The sharpness parameter represents image sharpness. The image area parameter represents a range of the image area. A first image acquired in the current environment may be referred to as the first original image in this method. Other images may also be used, which is not limited by the present disclosure.

Figure 2A:
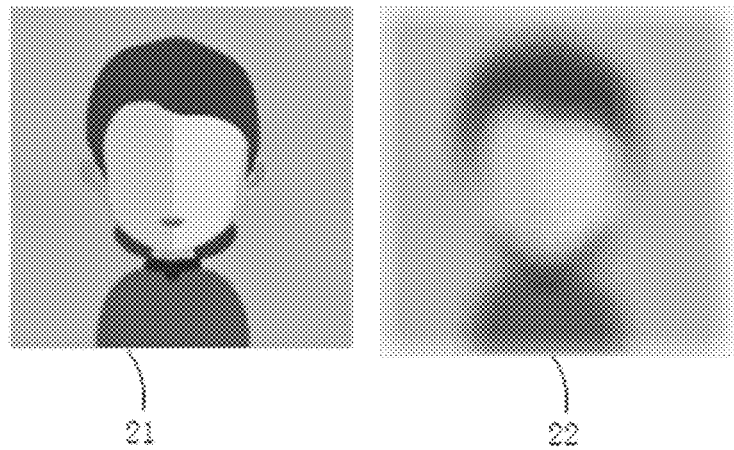
FIG. 2A illustrates a schematic diagram of comparison between a processed image and an original image according to some embodiments of the present disclosure.

In some embodiments, after the first device acquires the first original image through the image acquisition device, the sharpness parameter of the first original image is obtained from image information carried in the first original image. Then, the sharpness parameter of the first original image is adjusted to obtain the first processed image. In this case, the sharpness parameter of the first processed image and the sharpness parameter of the first original image have the first difference. For example, the sharpness parameter of the first processed image is smaller than the sharpness parameter of the first original image. In other words, the sharpness of the first processed image is lower than the sharpness of the first original image. FIG. 2A illustrates a schematic diagram of comparison between a processed image and an original image according to some embodiments of the present disclosure. As shown in FIG. 2A, the sharpness parameter of the first original image 21 represents the original image sharpness. After the sharpness parameter of the first original image 21 is adjusted, the first processed image 22 is obtained. The sharpness parameter of the first processed image 22 is smaller than the sharpness parameter of the first original image 21.

In some embodiments, after the first device acquires the first original image through the image acquisition device, a facial recognition process may also be performed on the first original image to obtain a first face image in the first original image. Then, the first face image is excluded from the first original image and the remaining image is a first partial original image. Based on the image information carried in the first partial original image, the sharpness parameter of the first partial original image is obtained. The sharpness parameter of the first partial original image is adjusted to obtain the first processed image. In this case, the sharpness parameter of the first processed image and the sharpness parameter of the first original image have the first difference. For example, the sharpness parameter of the first processed image is smaller than the sharpness parameter of the first face image in the first original image. In other words, the sharpness of the first processed image is lower than the sharpness of the first face image in the first original image.

In some embodiments, if the first device does not recognize the first face image in the first original image, the sharpness parameter representing the entire first original image is obtained based on the image information carried in the first original image. The sharpness parameter of the first original image is adjusted to obtain the first processed image, such that the sharpness parameter of the first processed image is smaller than the sharpness parameter of the first original image.

In some embodiments, after the first device acquires the first original image through the image acquisition device, the image area parameter of the first original image is obtained based on the image information carried in the first original image. Then, the image area parameter of the first original image is adjusted to obtain the first processed image. That is, an area range process is performed on the first original image, for example, cropping, such that the first processed image is a portion of the first original image. And, the first processed image is displayed in an image rendering region of the first device originally for the first original image. In this case, the image area parameter of the first processed image and the image area parameter of the first original image have the first difference.

Figure 2B:
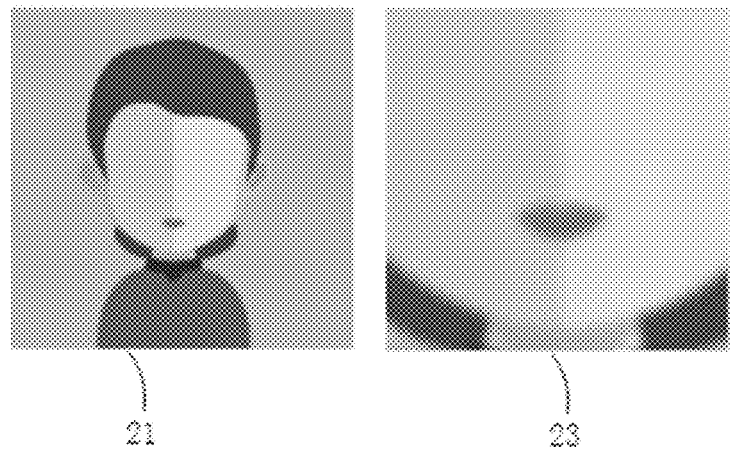
FIG. 2B illustrates a schematic diagram of comparison between another processed image and an original image according to some embodiments of the present disclosure.

FIG. 2B illustrates a schematic diagram of comparison between another processed image and an original image according to some embodiments of the present disclosure. As shown in FIG. 2B, the image area parameter of the first original image 21 represents the entire image content of the original image. After the image area parameter of the first original image 21 is adjusted, the first processed image 23 is obtained. The first processed image 23 includes a portion of the image content of the enlarged first original image 21.

It can be understood that the image rendering region of the first device for the first processed image may be equal to or smaller than the image rendering region originally for the first original image. When the first processed image is displayed in the image rendering region for the first original image, if the enlargement of the first processed image is insufficient to fill the entire image rendering region for the original image, a blank space may exist in the image rendering region for the first original image. At this point, the first device may extract color information in the periphery of the first processed image and fill the blank space with a color matching the color information extracted from the periphery. In some embodiments, the first device may also directly fill the blank space with a default color based on system setting information. In some other embodiments, the first device may fill the blank space with a user defined pattern.

At 102, a second original image is acquired and a second processing is performed on the second original image to obtain a second processed image. The resolution parameter of the second processed image and the resolution parameter of the second original image have a second difference.

In some embodiments, the second original image and the first original image are two consecutive frames of a plurality of images consecutively acquired by the first device. For example, the first original image includes the first frame of the plurality of consecutively acquired original images and the second original image includes the second frame of the plurality of consecutively acquired original images. In some other embodiments, the second original image and the first original image are two consecutive frame groups of a plurality of images consecutively acquired by the first device. For example, the first original image includes the first frame through the fourth frame of the plurality of consecutively acquired original images and the second original image includes the fifth frame through the eighth frame of the plurality of consecutively acquired original images.

After the first device acquires the second original image through the image acquisition device, the sharpness parameter of the second original image is obtained based on the image information carried in the second original image. Then, the sharpness parameter of the second original image is adjusted to obtain the second processed image. In this case, the sharpness parameter of the second processed image and the sharpness parameter of the second original image have the second difference. For example, the sharpness parameter of the second processed image is smaller than the sharpness parameter of the second original image. In other words, the sharpness of the of the second processed image is lower than the sharpness of the second original image.

It should be noted that the second difference is different from the first difference, which may indicate that the sharpness parameter of the second processed image is different from the sharpness parameter of the first processed image.

For example, when the sharpness parameter of the second processed image is greater than the sharpness parameter of the first processed image, the second difference is smaller than the first difference. In other words, the sharpness of the second processed image is higher than the sharpness of the first processed image. That is, as the processing continues, the image obtained after processing the original image gradually becomes clear. In a specific application scene, for example, video chatting, the obtained processed images change from blurred to clear and the processed images are sent to a second device of the other party of the video chatting.

In another example, when the sharpness parameter of the second processed image is smaller than the sharpness parameter of the first processed image, the second difference is greater than the first difference. In other words, the sharpness of the second processed image is lower than the sharpness of the first processed image. In a specific implementation, as the processing continues, the image obtained after processing the original image gradually becomes blurred.

In some embodiments, after the first device acquires the second original image through the image acquisition device, the facial recognition process may also be performed on the second original image to obtain a second face image in the second original image. Then, the second face image is excluded from the second original image and the remaining image is a second partial original image. Based on the image information carried in the second partial original image, the sharpness parameter of the second partial original image is obtained. The sharpness parameter of the second partial original image is adjusted to obtain the second processed image. In this case, the sharpness parameter of the second processed image and the sharpness parameter of the second original image have the second difference. For example, the sharpness parameter of the second processed image is smaller than the sharpness parameter of the second face image in the second original image. In other words, the sharpness of the second processed image is lower than the sharpness of the second face image in the second original image.

In some embodiments, if the first device does not recognize the second face image in the second original image, the sharpness parameter representing the entire second original image is obtained based on the image information carried in the second original image. The sharpness parameter of the second original image is adjusted to obtain the second processed image, such that the sharpness parameter of the second processed image is smaller than the sharpness parameter of the second original image.

It should be noted that the second difference is different from the first difference, which may indicate that the sharpness parameter of the second processed image is different from the sharpness parameter of the first processed image.

For example, when the sharpness parameter of the second processed image is greater than the sharpness parameter of the first processed image, the second difference is smaller than the first difference. In other words, the sharpness of the second processed image is higher than the sharpness of the first processed image. That is, as the processing continues, the image obtained after processing the original image gradually becomes clear. In a specific application scene, for example, video chatting, the obtained processed images change from blurred to clear and the processed images are sent to the second device of the other party of the video chatting.

In another example, when the sharpness parameter of the second processed image is smaller than the sharpness parameter of the first processed image, the second difference is greater than the first difference. In other words, the sharpness of the second processed image is lower than the sharpness of the first processed image. In a specific implementation, as the processing continues, the image obtained after processing the original image gradually becomes blurred.

In some embodiments, after the first device acquires the second original image through the image acquisition device, the image area parameter of the second original image is obtained based on the image information carried in the second original image. Then, the image area parameter of the second original image is adjusted to obtain the second processed image. That is, the area range process is performed on the second original image, for example, cropping, such that the second processed image is a portion of the second original image. And, the second processed image is displayed in the image rendering region of the first device originally for the second original image. In this case, the image area parameter of the second processed image and the image area parameter of the second original image have the second difference. For example, the image area parameter of the second processed image is smaller than the image area parameter of the second original image. In other words, the image content of the second processed image is less than the image content of the second original image.

It can be understood that the image rendering region of the first device for the second processed image may be equal to or smaller than the image rendering region originally for the second original image. When the second processed image is displayed in the image rendering region for the second original image, if the enlargement of the second processed image is insufficient to fill the entire image rendering region for the original image, a blank space may exist in the image rendering region for the second original image. At this point, the first device may extract the color information in the periphery of the second processed image and fill the blank space with the color matching the color information extracted from the periphery. In some embodiments, the first device may also directly fill the blank space with the default color based on the system setting information. In some other embodiments, the first device may fill the blank space with the user defined pattern.

It should be noted that the second difference is different from the first difference, which may indicate that the image area parameter of the second processed image is different from the image area parameter of the first processed image.

For example, when the image area parameter of the second processed image is greater than the image area parameter of the first processed image, the second difference is smaller than the first difference. For example, the first processed image is a partial area, which is 70% of the first original image, and the second processed imaged is another partial area, which is 80% of the second original image. If the first processed image and the second processed image are displayed in the image rendering region of the first device for the original image at a same enlargement ratio, the rendering effect of the processed image is changing closer and closer to the original image.

In some embodiments, after the first device acquires the second original image, the first device outputs the first original image and the second original image. As such, the user is reminded if the image acquisition device is accidentally turned on, thereby prompting the user to timely turn off the image acquisition device.

In some embodiments, after the first device obtains the second processed image, the first device outputs the first processed image and the second processed image. As such, if the user accidentally turns on the image acquisition device, the user is aware of the user's image displayed in the image outputted to the second device. Thus, the user may timely adjust the user's current image or may simply turn off the image acquisition device.

In some embodiments, after receiving the start instruction for the image acquisition device, the first device responds to the start instruction and detects whether at least one application program in the first device associated with the image acquisition device is using the image acquisition device. Based on the detection result that at least one application program is using the image acquisition device, the device that performs the video communication with the first device through the application program is referred to as the second device. After the second processed image is obtained, the first processed image and the second processed image are sent to the second device through the application program. For example, the blurred image and/or the enlarged image is sent to the second device.

As such, the processed images are sent to the second device to avoid displaying the original images of the user in the current environment at the first device side at the second device, thereby improving the privacy protection of the user at the first device.

In some embodiments, after the first device acquires the second original image, the first device may acquire a third original image and obtain the sharpness parameter and/or the image area parameter of the third original image based on the image information carried in the third original image. Then, the sharpness parameter and/or the image area parameter of the third original image is adjusted to obtain a third processed image. In this case, the sharpness parameter and/or the image area parameter of the third processed image and the sharpness parameter and/or the image area parameter of the third original image have a third difference. For example, the sharpness parameter of the third processed image is smaller than the sharpness parameter of the third original image. In other words, the sharpness of the third processed image is lower than the sharpness of the third original image.

In some embodiments, the third original image and the second original image are two consecutive frames of the plurality of images consecutively acquired by the first device. For example, the third original image includes the third frame of the plurality of images consecutively acquired by the first device and the second original image includes the fourth frame of the plurality of images consecutively acquired by the first device. In some other embodiments, the third original image and the second original image are two consecutive frame groups of the plurality of images consecutively acquired by the first device. For example, the third original image includes the fifth frame through the seventh frame of the plurality of images consecutively acquired by the first device and the second original image includes the eighth frame through the tenth frame of the plurality of images consecutively acquired by the first device.

In some embodiments, after the first device acquires the third original image through the image acquisition device, the facial recognition process may also be performed on the third original image to obtain a third face image in the third original image. Then, the third face image is excluded from the third original image and the remaining image is a third partial original image. Based on the image information carried in the third partial original image, the sharpness parameter and/or the image area parameter of the third partial original image is obtained. The sharpness parameter and/or the image area parameter of the third partial original image is adjusted to obtain the third processed image. In this case, the sharpness parameter and/or the image area parameter of the third processed image and the sharpness parameter and/or the image area parameter of the third original image have the third difference. For example, the sharpness parameter of the third processed image and the sharpness parameter of the third original image have the third difference. In other words, the sharpness parameter of the third processed image is smaller than the sharpness parameter of the entire third original image, or the sharpness parameter of the third processed image is smaller than the sharpness parameter of the third partial original image in the third original image.

The image area parameter of the third processed image and the image area parameter of the third original image have the third difference. In other words, the image area parameter of the third processed image is smaller than the image area parameter of the third original image, and the image area parameter of the third processed image is greater than the image area parameter of the third partial original image in the third original image.

It should be noted that the third difference is different from the second difference, and the second difference is different from the first difference.

For example, when the sharpness parameter of the third processed image is greater than the sharpness parameter of the second processed image, and the sharpness parameter of the second processed image is greater than the sharpness parameter of the first processed image, the third difference is smaller than the second difference, and the second difference is smaller than the first difference. In other words, the sharpness of the third processed image is higher than the sharpness of the second processed image, and the sharpness of the second processed image is higher than the sharpness of the first processed image. That is, as the processing continues, the image obtained after processing the original image gradually becomes clear. In a specific application scene, for example, video chatting, the obtained processed images change from blurred to clear and the processed images are sent to the second device of the other party of the video chatting.

In another example, when the sharpness parameter of the third processed image is smaller than the sharpness parameter of the second processed image, and the sharpness parameter of the second processed image is smaller than the sharpness parameter of the first processed image, the third difference is greater than the second difference, and the second difference is greater than the first difference. In other words, the sharpness of the third processed image is lower than the sharpness of the second processed image, and the sharpness of the second processed image is lower than the sharpness of the first processed image.

In another example, when the sharpness parameter of the third processed image is greater than the sharpness parameter of the second processed image, and the sharpness parameter of the second processed image is smaller than the sharpness parameter of the first processed image, the third difference is smaller than the second difference, and the second difference is greater than the first difference. In other words, the sharpness of the third processed image is higher than the sharpness of the second processed image, and the sharpness of the second processed image is lower than the sharpness of the first processed image. In a specific implementation, as the processing continues, the image obtained after processing the original image is sometimes clear and is sometimes blurred. In a specific application scene, for example, video chatting, the obtained processed images change from clear to blurred and from blurred to clear, and the processed images are sent to the second device of the other party of the video chatting. As such, the user is given a more versatile visual experience.

In another example, when the sharpness parameter of the third processed image is smaller than the sharpness parameter of the second processed image, and the sharpness parameter of the second processed image is greater than the sharpness parameter of the first processed image, the third difference is greater than the second difference, and the second difference is smaller than the first difference. In other words, the sharpness of the third processed image is lower than the sharpness of the second processed image, and the sharpness of the second processed image is higher than the sharpness of the first processed image. In a specific implementation, as the processing continues, the image obtained after processing the original image is sometimes blurred and is sometimes clear. In a specific application scene, for example, video chatting, the obtained processed images change from blurred to clear and from clear to blurred, and the processed images are sent to the second device of the other party of the video chatting. As such, the user is given the more versatile visual experience.

In some embodiments, if the first device does not recognize the third face image in the third original image, the sharpness parameter of the third original image is obtained based on the image information carried in the third original image, and the sharpness parameter representing the entire third original image is adjusted to obtain the third processed image. In this case, the sharpness parameter of the third processed image and the sharpness parameter of the third original image have the third difference. For example, the sharpness parameter of the third processed image is smaller than the sharpness parameter of the entire third original image.

It should be noted that the third difference is different from the second difference, and the second difference is different from the first difference, which may indicate that the sharpness parameter of the third processed image is different from the sharpness of the second processed image, and the sharpness parameter of the second processed image is different from the sharpness parameter of the first processed image.

For example, when the sharpness parameter of the third processed image is greater than the sharpness parameter of the second processed image, and the sharpness parameter of the second processed image is greater than the sharpness parameter of the first processed image, the third difference is smaller than the second difference, and the second difference is smaller than the first difference. In other words, the sharpness of the third processed image is higher than the sharpness of the second processed image, and the sharpness of the second processed image is higher than the sharpness of the first processed image. That is, as the processing continues, the image obtained after processing the original image gradually becomes clear. In a specific application scene, for example, video chatting, the obtained processed images change from blurred to clear, and the processed images are sent to the second device of the other party of the video chatting.

In another example, when the sharpness parameter of the third processed image is smaller than the sharpness parameter of the second processed image, and the sharpness parameter of the second processed image is smaller than the sharpness parameter of the first processed image, the third difference is greater than the second difference, and the second difference is greater than the first difference. In other words, the sharpness of the third processed image is lower than the sharpness of the second processed image, and the sharpness of the second processed image is lower than the sharpness of the first processed image. In a specific implementation, as the processing continues, the image obtained after processing the original image gradually becomes blurred.

When the sharpness parameter of the third processed image is greater than the sharpness parameter of the second processed image, and the sharpness parameter of the second processed image is smaller than the sharpness parameter of the first processed image, the third difference is smaller than the second difference, and the second difference is greater than the first difference. In other words, the sharpness of the third processed image is higher than the sharpness of the second processed image, and the sharpness of the second processed image is lower than the sharpness of the first processed image. In a specific implementation, as the processing continues, the image obtained after processing the original image is sometimes clear and is sometimes blurred. In a specific application scene, for example, video chatting, the obtained processed images change from clear to blurred and from blurred to clear, and the processed images are sent to the second device of the other party of the video chatting. As such, the user is given the more versatile visual experience.

In another example, when the sharpness parameter of the third processed image is smaller than the sharpness parameter of the second processed image, and the sharpness parameter of the second processed image is greater than the sharpness parameter of the first processed image, the third difference is greater than the second difference, and the second difference is smaller than the first difference. In other words, the sharpness of the third processed image is lower than the sharpness of the second processed image, and the sharpness of the second processed image is higher than the sharpness of the first processed image. In a specific implementation, as the processing continues, the image obtained after processing the original image is sometimes blurred and is sometimes clear. In a specific application scene, for example, video chatting, the obtained processed images change from blurred to clear and from clear to blurred, and the processed images are sent to the second device of the other party of the video chatting. As such, the user is given the more versatile visual experience.

In some embodiments, after the first device acquires the third original image through the image acquisition device, the image area parameter of the third original image is obtained based on the image information carried in the third original image, and the image area parameter of the third original image is adjusted to obtain the third processed image. That is, the area range process is performed on the third original image, for example, cropping, such that the third processed image is a portion of the third original image. And, the third processed image is displayed in the image rendering region of the first device originally for the third original image. In this case, the image area parameter of the third processed image and the image area parameter of the third original image have the third difference. For example, the image area parameter of the third processed image is smaller than the image area parameter of the third original image. In other words, the image content of the third processed image is less than the image content of the third original image.

It can be understood that the image rendering region of the first device for the third processed image may be equal to or smaller than the image rendering region originally for the third original image. When the third processed image is displayed in the image rendering region for the third original image, if the enlargement of the third processed image is insufficient to fill the entire image rendering region for the original image, a blank space may exist in the image rendering region for the third original image. At this point, the first device may extract the color information in the periphery of the third processed image and fill the blank space with the color matching the color information extracted from the periphery. In some embodiments, the first device may also directly fill the blank space with the default color based on the system setting information. In some other embodiments, the first device may fill the blank space with the user defined pattern.

It should be noted that the third difference is different from the second difference, and the second difference is different from the first difference, which may indicate that the image area parameter of the third processed image is different from the image area parameter of the second processed image, and the image area parameter of the second processed image is different from the image area parameter of the first processed image.

For example, when the image area parameter of the third processed image is greater than the image area parameter of the second processed image, and the image area parameter of the second processed image is greater the image area parameter of the first processed image, the third difference is smaller than the second difference, and the second difference is smaller than the first difference. For example, the first processed image is a partial area, which is 70% of the first original image, the second processed imaged is another partial area, which is 80% of the second original image, and the third processed imaged is another partial area, which is 95% of the third original image. If the first processed image, the second processed image, and the third processed image are displayed in the image rendering region of the first device for the original image at a same enlargement ratio, the rendering effect of the processed image is changing closer and closer to the original image.

In some embodiments, after the first device acquires the third original image, the first device outputs the third original image. As such, the user is reminded if the image acquisition device is accidentally turned on, thereby prompting the user to timely turn off the image acquisition device.

In some embodiments, after the first device obtains the third processed image, the first device outputs the third processed image. As such, if the user accidentally turns on the image acquisition device, the user is aware of the user's image displayed in the image outputted to the second device. Thus, the user may timely adjust the user's current image or may simply turn off the image acquisition device.

In some embodiments, after the first device obtains the third processed image, the first device sends the third processed image to the second device. For example, the blurred image and/or the enlarged image is sent to the second device. As such, the processed images are sent to the second device to avoid immediately displaying the original images of the user in the current environment at the first device side at the second device, thereby improving the privacy protection of the user at the first device.

In some embodiments, after the first device acquires the third original image, the first device may acquire a fourth original image. The fourth original image and the third original image are two consecutive frames of the plurality of images consecutively acquired by the first device. For example, the fourth original image includes the third frame of the plurality of images consecutively acquired by the first device and the third original image includes the fourth frame of the plurality of images consecutively acquired by the first device. In some other embodiments, the fourth original image and the third original image are two consecutive frame groups of the plurality of images consecutively acquired by the first device. For example, the fourth original image includes the tenth frame through the twelfth frame of the plurality of images consecutively acquired by the first device, and the third original image includes the thirteenth frame through the sixteenth frame of the plurality of images consecutively acquired by the first device.

When the third difference is smaller than the second difference and the second difference is smaller than the first difference, the sharpness parameter of the third processed image is the same as the sharpness parameter of the fourth original image. Alternatively, the image area parameter of the third processed image is the same as the image area parameter of the fourth original image. At this time, the first device stops performing processing on the acquired fourth original image. In a specific application scene, for example, video chatting, the first device sends the fourth original image to the second device. At this time, the entire content of the environment of the first device is visible to the second device.

In some embodiments, an image processing is performed on the acquired original image, and the processed image is sent to the second device, such that, when the second device receives the processed image, the clear original image is not immediately visible. Instead, the image displayed at the second device changes from blurred to clear or from enlarged to original. For example, the processed image is the blurred image or the enlarged image. As such, the a response time is provided to the user at the first device. If the user at the first device accidentally turns on the image acquisition device, the user may timely turn off the image acquisition device to avoid the embarrassment of both parties caused by the accidental turn-on of the image acquisition device when the user at the second device sees the image of the environment at the first device.

For example, the user at the first device is in the environment that is dirty, messy, or is showing an inappropriate image of the user. At this time, it is undesirable for the user at the second device to see the image of the environment of the user at the first device. In the embodiments of the present disclosure, when the user at the first device accidentally turns on the image acquisition device, the user at the second device cannot immediately see the clear image of the environment of the user at the first device, thereby avoiding the embarrassment of the both parties.

In some embodiments, when the third difference is greater than the second difference and the second difference is greater than the first difference, the first device continues to obtain the sharpness parameter and/or the image area parameter of the fourth original image based on the image information carried in the fourth original image, and to adjust the sharpness parameter and/or the image area parameter of the fourth original image to obtain the fourth processed image. At this time, the sharpness parameter and/or the image area parameter of the fourth processed image is the same as the sharpness parameter and/or the image area parameter of the third processed image. For example, the sharpness parameter of the fourth processed image is equal to the sharpness parameter of the third original image. In other words, the sharpness of the fourth processed image is the same as the sharpness of the third original image. The same third processing performed on the third original image is performed on the fourth original image to obtain the fourth processed image.

In this case, for details of processing the fourth original image, reference can be made to the procedure of processing the third original image, which will not be described herein again.

When the sharpness parameter and/or the image area parameter of the fourth processed image are the same as the sharpness parameter and/or the image area parameter of the third processed image, the sharpness of the fourth processed image is completely blurred or the image area of the fourth processed image has been enlarged to a system pre-set size. At this time, when the first device sends the fourth processed image to the second device, the image content is completely blurred at the second device, thereby improving the privacy protection of the user at the first device.

In some embodiments, after the first device acquires the fourth original image, the first device may immediately display the fourth original image locally. As such, the user may timely discover whether the image acquisition device is accidentally turned on, thereby achieving the objective of reminding the user.

In some embodiments, after the first device obtains the fourth processed image, the first device may output the fourth processed image. In this way, the user at the first device is timely aware of the user's image currently displayed at the second device. As such, if the user finds the user's image inappropriately, the user is able to timely remedy the inadvertent showing of the user's image to avoid exposing the user's privacy. For example, the user may timely turn off the image acquisition device. When the user at the first device decides that the current environment is appropriate for the user at the second device to see, the user at the first device may control the first device by touch to immediately stop performing the processing on the original image, and to immediately send the original image to the second device. In some other embodiments, the first device starts a counter when the first device processes the first image frame. When the counter reaches a pre-set time, the first device stops performing the processing on the original image. At this time, the first device sends the original image to the second device.

In this case, the pre-set time may be a system default setting time or may be a user defined time.

In the embodiments of the present disclosure, when the user at the first device accidentally turns on the image acquisition device, the user at the second device will not receive the original image sent by the first device. Instead, the second device receives the processed image and the sharpness of the received image gradually changes from blurred to clear or image area of the received image gradually changes from enlarged to normal. Thus, the damage caused by exposing the user's privacy is avoided.

In some embodiments, before the first device acquires the second original image, the first device may acquire the third original image through the image acquisition device, and the same processing performed on the first original image is performed on the third original image to obtain the third processed image.

In this case, the third original image and the first original image are two frames in the plurality of images consecutively acquired by the first device, and the first original image and the third original image are the images preceding the second original image. For example, the first original image is the first frame, the third original image is the second frame, and the second original image is the third frame. Alternatively, the third original image is a frame group and the third original image is the frame group preceding the second original image. For example, the first original image is the frame acquired in the 1st second. The third original image is the frame group acquired in the 2nd second through the 10th second. The second original image is the frame acquired in the 11th second.

In some embodiments, after the first device acquires the third original image, the same processing performed on the first original image is performed on the third original image to obtain the third processed image. At this time, no processing is performed on the second original image. The resolution parameter of the second processed image corresponding to the second original image is the same as the resolution parameter of the second original image. That is, the second difference between the sharpness parameter and/or the image area parameter of the second processed image and the sharpness parameter and/or the image area parameter of the second original image is "0".

For example, when the first device processes the first original image, the sharpness parameter of the first original image is reduced to a first parameter, the sharpness parameter of the third original image is also reduced to the first parameter to obtain the third processed image, and the obtained third processed image and the second original image are sent to the second device. Alternatively, when the first device processes the first original image, the image area parameter of the first original image is adjusted to a second parameter, the image area parameter of the third original image is also adjusted to the second parameter to obtain the third processed image. As such, the display effect of the images is stable. For example, the image is blurred in the 1st second through the 10th second and is clear in the 11th second. The obtained third processed image and the second original image are sent to the second device.

In some embodiments, the processing is performed on the acquired original image to obtain the processed image, such that the resolution parameter of the processed image is different from the resolution parameter of the original image. When the user at the first device accidentally turns on the image acquisition device, the processed image is sent to the second device at the opposite side. The image displayed at the second device changes from blurred to clear or from enlarged to normal to avoid exposing the user privacy when the user at the second device immediately sees the image of the environment of the user at the first device.

Figure 3:
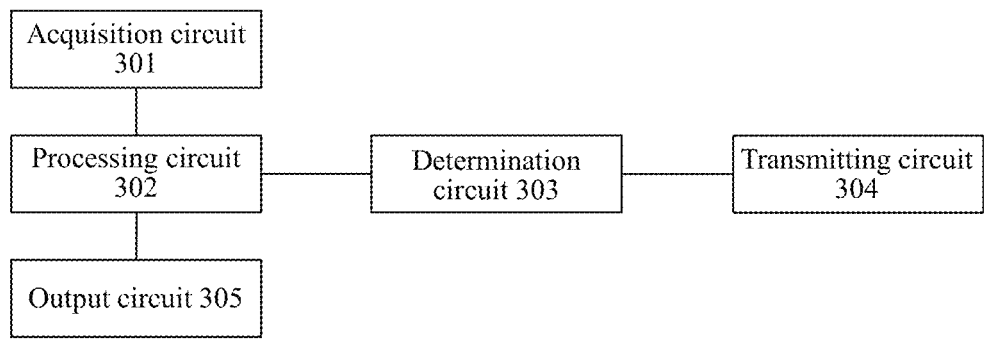
FIG. 3 illustrates a block diagram of a data processing device according to some embodiments of the present disclosure.

FIG. 3 illustrates a block diagram of a data processing device according to some embodiments of the present disclosure. As shown in FIG. 3, the device includes the following.

An acquisition circuit 301 is configured to acquire a first original image and a second original image.

A processing circuit 302 is configured to perform a first processing on the first original image to obtain a first processed image. A resolution parameter of the first processed image and a resolution parameter of the first original image have a first difference. The processing circuit 302 is further configured to perform a second processing on the second original image to obtain a second processed image. The resolution parameter of the second processed image and the resolution parameter of the second original image have a second difference. The second difference is different from the first difference.

The first original image and the second original image are two frames in a plurality of consecutively acquired original images.

In some embodiments, the resolution parameter includes a sharpness parameter configured to represent image sharpness or an image area parameter configured to represent a range of the image area.

In some embodiments, the acquisition circuit 301 is further configured to acquire a third original image, and the processing circuit 302 is further configured to perform a third processing on the third original image to obtain a third processed image. The resolution parameter of the third processed image and the third original image have a third difference. The third difference is smaller than the second difference, and the second difference is smaller than the first difference. In some other embodiments, the third difference is greater than the second difference, and the second difference is greater than the first difference. The third original image and the second original image are two frames in the plurality of consecutively acquired original images.

In some embodiments, the acquisition circuit 301 is further configured to acquire a fourth original image. The fourth original image and the third original image are two frames in the plurality of consecutively acquired original images. If the third difference is smaller than the second difference and the second difference is smaller than the first difference, the resolution parameter of the third processed image is the same as the resolution parameter of the fourth original image. In some other embodiments, if the third difference is greater than the second difference and the second difference is greater than the first difference, the processing circuit 302 is triggered to perform a fourth processing on the fourth original image to obtain a fourth processed image. The resolution parameter of the fourth processed image is the same as the resolution parameter of the third processed image.

In some embodiments, the processing circuit 302 is further configured to adjust the sharpness of a first partial original image in the first original image to obtain the first processed image, and to adjust the sharpness of a second partial original image in the second original image to obtain the second processed image.

In some embodiments, the acquisition circuit 301 is further configured to respond to a start instruction for the image acquisition device to acquire the first original image.

In some embodiments, the device further includes a determination circuit 303 and a transmitting circuit 304. The determination circuit 303 is configured to determine a second device with which the first device communicates. The transmitting circuit 304 is configured to send the first processed image and the second processed image to the second device.

In some embodiments, the device further includes an output circuit 305. The output circuit 305 is configured to output the first original image and the second original image.

In some embodiments, the resolution parameter includes a sharpness parameter or an image area parameter. Before the second original image is acquired, the acquisition circuit 301 is further configured to acquire the third original image. The processing circuit 302 is further configured to perform the same first processing performed on the first original image on the third original image to obtain the third processed image.

It should be noted that when the data processing device performs the processing on the original image, division of various program modules is intended to illustrative. In practical applications, distribution of the processing may be implemented by different program modules. That is, the division of the internal structure of the data processing device may include different program modules to implement all or some foregoing processing. In addition, the data processing device embodiments and the data processing method embodiments share the same idea. For details of the data processing device embodiments, reference can be made to the data processing method embodiments, which will not be described herein again.

Figure 4:
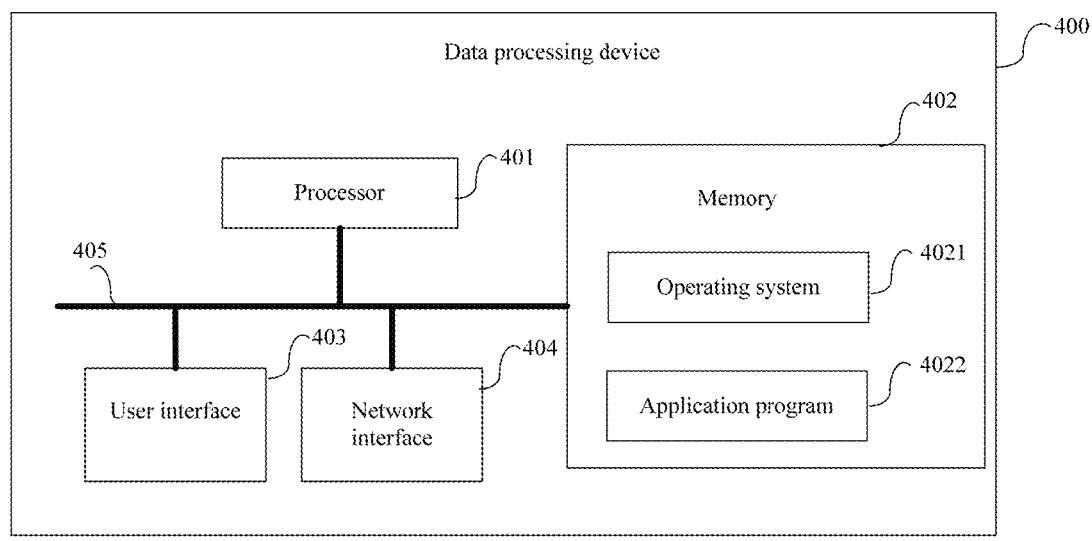
FIG. 4 illustrates a structural diagram of a data processing device according to some embodiments of the present disclosure.

FIG. 4 illustrates a structural diagram of a data processing device according to some embodiments of the present disclosure. As shown in FIG. 4, the data processing device 400 may be a smart speaker, a mobile phone, a smart pen, a smart watch, a smart ring, a smart wristband, a smart glove, a smart TV, a tablet computer, a video camcorder, or an audio recorder, etc. As shown in FIG. 4, the data processing device 400 includes: at least one processor 401, a memory 402, at least one network interface 404, and a user interface 403. The circuits in the data processing device 400 are coupled together through a bus system 405. The bus system 405 is configured to provide connection communication between the circuits. In addition to a data bus, the bus system 405 further includes a power bus, a control bus, and a status signal bus. However, for clarity of description, the various buses are labelled as the bus system 405.

The user interface 403 may include a display, a keyboard, a mouse, a trackball, a click wheel, keys, buttons, a touch panel, and a touch screen, etc.

It should be understood that the memory 402 may be a volatile memory or a non-volatile memory or a combination thereof. The non-volatile memory may be a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disk, and a compact-disc read-only memory (CD-ROM). The magnetic surface memory may be a magnetic disk memory or a magnetic tape memory. The volatile memory may be a random-access memory (RAM) as an external high-speed buffer. The foregoing example are intended to be illustrative rather than restrictive. Many forms of RAMs may be used, such as, a static random-access memory (SRAM), a synchronous static random-access memory (SSRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a SyncLink dynamic random-access memory (SLDRAM), and a direct Rambus random-access memory (DRRAM). In the embodiments of the present disclosure, the memory 402 includes, but is not limited to, the foregoing memories and any other suitable combinations thereof.

In the embodiments of the present disclosure, the memory 402 is configured to store various types of data to support operations of the data processing device 400. For example, the data may include: any computer programs operated by the data processing device 400, such as an operating system 4021 and an application program 4022. The operating system 4021 includes various system programs, such as a framework layer, a core library layer, and a driver layer, for implementing various basic services and processing hardware-based tasks. The application program 4022 may include various application programs, such as a media player and a browser, for implementing various application services. The program implementing the method embodiments may be included in the application program 4022.

The method embodiments may be applied to the processor 401 or may be implemented by the processor 401. The processor 401 may be an integrated circuit chip, capable of signal processing. In the implementation process, the steps of the foregoing method may be implemented by the hardware integrated logic circuits or software-form instructions in the processor 401. The processor 401 may be a general-purpose processor, a digital signal processor (DSP), or other programmable logic components, discrete gates or transistor logic components, discrete hardware components, etc. The processor 401 may implement or execute various methods, steps, and logic block diagrams described in the embodiments of the present disclosure. The general-purpose processor may be a microprocessor or any conventional processor. The steps of the method described in the embodiments of the present disclosure may be directly implemented by a hardware decoding processor or may be performed by a combination of hardware and software modules in the decoding processor. The software modules may be stored in a storage medium, which may be the memory 402. The processor 401 retrieves information from the memory 402 to implement the steps of the foregoing method in combination with the hardware.

In some embodiments, the data processing device 400 may be implemented by one or more of an application specific integrated circuit (ASIC), a digital signal processor (DSP), a programmable logic device (PLD), a complex programmable logic device (CPLD), a field-programmable gate array (FPGA), a general-purpose processor, a controller, a microcontroller unit (MCU), a microprocessor, or other electronic components, for performing the foregoing method.

Specifically, when running the computer program, the processor 401 is configured to perform: acquiring a first original image and performing a first processing on the first original image to obtain a first processing image. The resolution parameter of the first processed image and the resolution parameter of the first original image have a first difference. The processor 401 is configured to perform: acquiring a second original image and performing a second processing on the second original image to obtain a second processed image. The resolution parameter of the second processed image and the resolution parameter of the second original image have a second difference. The second difference is different from the first difference. The first original image and the second original image are two frames in a plurality of consecutively acquired original images.

In some embodiments, the resolution parameter includes a sharpness parameter. The sharpness parameter represents image sharpness. In some other embodiments, the resolution parameter includes an image area parameter. The image area parameter represents a range of the image area.

When running the computer program, the processor 401 is configured to perform: acquiring a third original image and performing a third processing on the third original image to obtain a third processing image. The resolution parameter of the third processed image and the resolution parameter of the third original image have a third difference. The third difference is smaller than the second difference, and the second difference is smaller than the first difference. Alternatively, the third difference is greater than the second difference, and the second difference is greater than the first difference. The third original image and the second original image are two frames in the plurality of consecutively acquired original images.

When running the computer program, the processor 401 is configured to perform: acquiring a fourth original image. The fourth original image and the third original image are two frames in the plurality of consecutively acquired original images. If the third difference is smaller than the second difference and the second difference is smaller than the first difference, the resolution parameter of the third processed image is the same as the resolution parameter of the fourth original image. Alternatively, if the third difference is greater than the second difference and the second difference is greater than the first difference, a fourth processing is performed on the fourth original image to obtain a fourth processed image. The resolution parameter of the fourth processed image is the same as the resolution parameter of the third processed image.

When running the computer program, the processor 401 is configured to perform: adjusting the sharpness parameter of a first partial original image in the first original image to obtain the first processed image and adjusting the sharpness parameter of a second partial original image in the second original image to obtain the second processed image.

When running the computer program, the processor 401 is configured to perform: acquiring the first original image in response to a start instruction for the image acquisition device.

When running the computer program, the processor 401 is configured to perform: determining a second device with which the first device communicate and to send the first processed image and the second processed image to the second device.

When running the computer program, the processor 401 is configured to perform: outputting the first original image and the second original image.

The resolution parameter includes the sharpness parameter or the image area parameter. Before the second original image is acquired, when running the computer program, the processor 401 is configured to perform: acquiring the third original image and performing the same first processing performed on the first original image on the third original image to obtain the third processed image.

In some embodiments, the present disclosure also provides a computer-readable storage medium, such as the memory 402 storing the computer program. The computer program may be executed by the processor 401 of the data processing device 400 to perform the steps of the foregoing method. The computer-readable storage medium may be a FRAM, a ROM, an EPROM, an EEPROM, a flash memory, a magnetic surface memory, an optical disk, or a CD-ROM. The computer-readable storage medium may also be various devices including one of the foregoing memories and any combination thereof, such as a mobile phone, a computer, a tablet, and a personal digital assistant, etc.

The computer-readable storage medium stores the computer program. When running the computer program, the processor is configured to perform: acquiring the first original image and performing the first processing on the first original image to obtain the first processed image, where the resolution parameter of the first processed image and the resolution parameter of the first original image have the first difference, and acquiring the second original image and performing the second processing on the second original image to obtain the second processed image, where the resolution parameter of the second processed image and the resolution parameter of the second original image have the second difference. The second difference is different from the first difference. The first original image and the second original image are two frames in the plurality of consecutively acquired original images.

The resolution parameter includes the sharpness parameter representing the image sharpness. Alternatively, the resolution parameter includes the image area parameter representing the range of the image area.

When running the computer program, the processor is further configured to perform: acquiring the first original image and performing the first processing on the first original image to obtain the first processed image, where the resolution parameter of the first processed image and the resolution parameter of the first original image have the first difference, and acquiring the second original image and performing the second processing on the second original image to obtain the second processed image, where the resolution parameter of the second processed image and the resolution parameter of the second original image have the second difference. The second difference is different from the first difference. The first original image and the second original image are two frames in the plurality of consecutively acquired original images.

When running the computer program, the processor is further configured to perform: acquiring the third original image and performing the third processing on the third original image to obtain the third processed image, where the resolution parameter of the third processed image and the resolution parameter of the third original image have the third difference. The third difference is smaller than the second difference, and the second difference is smaller than the first difference. Alternatively, the third difference is greater than the second difference, and the second difference is greater than the first difference. The third original image and the second original image are two frames in the plurality of consecutively acquired original images.

When running the computer program, the processor is further configured to perform: acquiring the fourth original image. The fourth original image and the third original image are two frames in the plurality of consecutively acquired original images. If the third difference is smaller than the second difference and the second difference is smaller than the first difference, the resolution parameter of the third processed image is the same as the resolution parameter of the fourth original image. Alternatively, if the third difference is greater than the second difference and the second difference is greater than the first difference, the fourth processing is performed on the fourth original image to obtain the fourth processed image. The resolution parameter of the fourth processed image is the same as the resolution parameter of the third processed image.

When running the computer program, the processor is further configured to perform: acquiring the first original image in response to the start instruction for the image acquisition device.

When running the computer program, the processor is further configured to perform: determining the second device with which the first device communicates and sending the first processed image and the second processed image to the second device.

When running the computer program, the processor is further configured to perform: outputting the first original image and the second original image.

The resolution parameter includes the sharpness parameter or the image area parameter. Before the second original image is acquired, when running the computer program, the processor is further configured to perform: acquiring the original image and performing the same first processing performed on the first original image on the third original image to obtain the third processed image.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Therefore, a true scope and spirit of the invention is indicated by the following claims.

What is claimed is:

1. A data processing method comprising:
   acquiring a first original image by a first device and performing a first processing on the first original image to obtain a first processed image, and sending the first processed image to a second device; wherein a resolution parameter of the first processed image and the resolution parameter of the first original image have a first difference;
   determining a response time for the first device;
   acquiring a second original image by the first device and performing a second processing on the second original image to obtain a second processed image; and
   after the lapse of the response time, sending the second processed image to the second device,
   wherein the resolution parameter of the second processed image and the resolution parameter of the second original image have a second difference, the second difference is less than the first difference, and the first original image and the second original image are two frames in a plurality of consecutively acquired original images.

2. The method according to claim 1, wherein:
   the resolution parameter includes a sharpness parameter representing image sharpness; or the resolution parameter includes an image area parameter representing a range of an image area.

3. The method according to claim 1, after the second original image is acquired, the method further includes:
   acquiring a third original image and performing a third processing on the third original image to obtain a third processed image, wherein the resolution parameter of the third processed image and the resolution parameter of the third original image have a third difference,
   wherein:
      the third difference is smaller than the second difference and the second difference is smaller than the first difference, or the third difference is greater than the second difference and the second difference is greater than the first difference; and
      the third original image and the second original image are two frames in the plurality of consecutively acquired original images.

4. The method according to claim 3, after the third original image is acquired, the method further includes:
   acquiring a fourth original image, wherein the fourth original image and the third original image are two frames in the plurality of consecutively acquired original images,
   wherein:
      if the third difference is smaller than the second difference and the second difference is smaller than the first difference, the resolution parameter of the third processed image is the same as the resolution parameter of the fourth original image; or
      if the third difference is greater than the second difference and the second difference is greater than the first difference, a fourth processing is performed on the fourth original image to obtain a fourth processed image and the resolution parameter of the fourth processed image is the same as the resolution parameter of the third processed image.

5. The method according to claim 1, wherein:
   the resolution parameter includes a sharpness parameter;
   the performing the first processing on the first original image to obtain the first processed image includes: adjusting the sharpness parameter of a first partial original image in the first original image to obtain the first processed image; and
   the performing the second processing on the second original image to obtain the second processed image includes: adjusting the sharpness parameter of a second partial original image in the second original image to obtain the second processed image.

6. The method according to claim 1, wherein:
   acquiring the first original image includes: acquiring the first original image in response to a start instruction for an image acquisition device.

7. The method according to claim 1, further comprising:
   outputting the first original image and the second original image.

8. The method according to claim 1, wherein:
   the resolution parameter includes a sharpness parameter or an image area parameter;
   before the second original image is acquired, the method further includes: acquiring a third original image and performing the same first processing performed on the first original image on the third original image to obtain a third processed image.

9. A data processing device, comprising:
an acquisition circuit configured to acquire a first original image and a second original image; and
a processing circuit configured to,
   perform a first processing on the first original image to obtain a first processed image, wherein a resolution parameter of the first processed image and the resolution parameter of the first original image have a first difference,
   determine a second device with which the data processing device communicates,
   send the first processed image to the second device,
   determine a response time for the data processing device,
   and to perform a second processing on the second original image to obtain a second processed image, and after the lapse of the response time, send the second processed image to the second device, wherein the resolution parameter of the second processed image and the resolution parameter of the second original image have a second difference,
wherein:
   the second difference is less than the first difference; and
   the first original image and the second original image are two frames in a plurality of consecutively acquired original images.

10. The device according to claim 9, wherein:
the resolution parameter includes a sharpness parameter representing image sharpness, or the resolution parameter includes an image area parameter representing a range of an image area.

11. The device according to claim 9, wherein:
after the second original image is acquired, the acquisition circuit is further configured to acquire a third original image and the processing circuit is further configured to perform a third processing on the third original image to obtain a third processed image;
the resolution parameter of the third processed image and the resolution parameter of the third original image have a third difference;
the third difference is smaller than the second difference and the second difference is smaller than the first difference, or the third difference is greater than the second difference and the second difference is greater than the first difference; and
the third original image and the second original image are two frames in the plurality of consecutively acquired original images.

12. The device according to claim 11, wherein:
after the third original image is acquired, the acquisition circuit is further configured to acquire a fourth original image;
the fourth original image and the third original image are two frames in the plurality of consecutively acquire original images;
if the third difference is smaller than the second difference and the second difference is smaller than the first difference, the resolution parameter of the third processed image is the same as the resolution parameter of the fourth original image; and
if the third difference is greater than the second difference and the second difference is greater than the first difference, a fourth processing is performed on the fourth original image to obtain a fourth processed image and the resolution parameter of the fourth processed image is the same as the resolution parameter of the third processed image.

13. The device according to claim 9, wherein:
the resolution parameter includes a sharpness parameter;
the performing the first processing on the first original image to obtain the first processed image includes: adjusting the sharpness parameter of a first partial original image in the first original image to obtain the first processed image; and
the performing the second processing on the second original image to obtain the second processed image includes: adjusting the sharpness parameter of a second partial original image in the second original image to obtain the second processed image.

14. The device according to claim 9, wherein:
acquiring the first original image includes: acquiring the first original image in response to a start instruction for an image acquisition device.

15. The device according to claim 9, wherein:
the processing circuit is further configured to output the first original image and the second original image.

16. The device according to claim 9, wherein:
the resolution parameter includes a sharpness parameter or an image area parameter;
before the second original image is acquired, the acquisition circuit is further configured to acquire a third original image and the processing circuit is further configured to perform the same first processing performed on the first original image on the third original image to obtain a third processed image.

* * * * *